US005888038A

United States Patent [19]

Ditch et al.

[11] Patent Number: 5,888,038

[45] Date of Patent: Mar. 30, 1999

[54] TIE-DOWN FOR WHEELCHAIRS

[75] Inventors: James A. Ditch, San Pedro; Frereidoun Razavi, Sun Valley, both of Calif.; Richard C. Magnuson, Kentwood, Mich.

[73] Assignee: American Seating Company, Grand Rapids, Mich.

[21] Appl. No.: 905,352

[22] Filed: Aug. 4, 1997

Related U.S. Application Data

[60] Provisional application No. 60/032,195, Dec. 2, 1996.

[51] Int. Cl.[6] .......... B60P 7/08

[52] U.S. Cl. .......... 410/7; 410/4; 410/18; 410/23; 296/65.04

[58] Field of Search .......... 410/3, 4, 7, 9, 410/10, 11, 12, 18, 19, 21, 22, 23, 51; 296/65.04; 297/DIG. 4; 280/304.1; 248/503.1

[56] References Cited

U.S. PATENT DOCUMENTS

| | | | |
|---|---|---|---|
| D. 328,646 | 8/1992 | Klearman et al. . | |
| D. 329,834 | 9/1992 | Miller . | |
| 1,436,435 | 11/1922 | Cooney | 410/18 |
| 1,780,317 | 11/1930 | Snyder . | |
| 3,955,847 | 5/1976 | Schiowitz . | |
| 4,019,752 | 4/1977 | Leon et al. . | |
| 4,093,303 | 6/1978 | Nelson . | |
| 4,103,934 | 8/1978 | Arnholt et al. . | |
| 4,113,270 | 9/1978 | Barecki . | |
| 4,221,396 | 9/1980 | Kehl . | |
| 4,246,984 | 1/1981 | Seay et al. . | |
| 4,257,644 | 3/1981 | Stephens . | |
| 4,325,576 | 4/1982 | Guthrie . | |
| 4,369,995 | 1/1983 | Harder, Jr. . | |
| 4,389,056 | 6/1983 | Tenniswood . | |
| 4,421,189 | 12/1983 | Watkins et al. . | |
| 4,422,455 | 12/1983 | Olsen . | |
| 4,427,210 | 1/1984 | Wevers | 410/23 X |
| 4,457,551 | 7/1984 | Anthony | 410/7 X |
| 4,475,762 | 10/1984 | DeLong et al. . | |
| 4,492,403 | 1/1985 | Blomgren et al. . | |
| 4,511,171 | 4/1985 | Petersen . | |
| 4,520,893 | 6/1985 | Keough | 410/4 X |
| 4,588,340 | 5/1986 | Howard | 410/7 |
| 4,593,929 | 6/1986 | Williams . | |
| 4,623,289 | 11/1986 | Apostolos | 410/7 |
| 4,664,584 | 5/1987 | Braun et al. . | |
| 4,688,843 | 8/1987 | Hall . | |
| 4,728,150 | 3/1988 | Gaudreau, Jr. . | |
| 4,730,964 | 3/1988 | Joyner | 410/23 |
| 4,754,987 | 7/1988 | Williams . | |
| 4,763,952 | 8/1988 | Gaudreau, Jr. . | |
| 4,804,308 | 2/1989 | Hamblin et al. . | |

(List continued on next page.)

FOREIGN PATENT DOCUMENTS

| | | | |
|---|---|---|---|
| 0437431 | 7/1991 | European Pat. Off. . | |
| 3927736A | 2/1991 | Germany | 2458 503.1 |
| 2188292 | 9/1987 | United Kingdom | 410/3 |

OTHER PUBLICATIONS

Brochure: "Restraint System", 1996, 1 page.

*Primary Examiner*—Stephen T. Gordon
*Attorney, Agent, or Firm*—Dickinson Wright PLLC

[57] ABSTRACT

Apparatus for securing one or more wheelchairs to a vehicle includes a plurality of straps for holding the wheelchairs to the vehicle. Some of the straps are attached to a movable element that can be moved into or out of the area to be occupied by the wheelchairs. This allows the area to be utilized by other passengers when no wheelchairs are present and also facilitates ingress and egress of the wheelchairs. In the preferred embodiment, movable elements, which carry housings for wheelchair-engaging belts and passenger restraint belts, are mounted to the side wall of the vehicle for pivotal movement about vertical axes between storage positions and operative positions. The apparatus allows an operator to quickly and easily secure or release a passenger in a wheelchair and maintains the integrity of the straps.

11 Claims, 7 Drawing Sheets

U.S. PATENT DOCUMENTS 4,826,193 5/1989 Davis .
4,842,458 6/1989 Carpenter .................................... 410/3
4,886,403 12/1989 Gresham ................................... 410/10
4,971,341 11/1990 Magnuson .
4,979,779 12/1990 Williams .
4,995,775 2/1991 Gresham ................................... 410/10
5,007,118 4/1991 Ebersole ............................ 297/DIG. 4
5,026,225 6/1991 McIntyre ................................... 410/23
5,042,878 8/1991 Collins .
5,259,081 11/1993 Henderson .............................. 410/3 X
5,344,265 9/1994 Ullman et al. .............................. 410/3
5,391,030 2/1995 Lee ............................................ 410/12
5,431,524 7/1995 Antal et al. ............................. 410/7 X
5,489,170 2/1996 Inoue et al. ................................ 410/7
5,567,095 10/1996 Jame et al. ................................. 410/7
5,626,397 5/1997 Reid .

TIE-DOWN FOR WHEELCHAIRS

CROSS REFERENCE TO RELATED APPLICATIONS

This application claims the priority of U.S. Provisional Application Ser. No. 60/032,195, which was filed on Dec. 2, 1996.

TECHNICAL FIELD

This invention relates to the art of apparatus for securing a wheelchair to a vehicle. The invention is particularly useful for securing one or more wheelchairs to a bus.

BACKGROUND

Persons using wheelchairs often wish to ride in a vehicle such as a bus, train, or airplane while remaining in the wheelchair. In these instances, the wheelchair must be secured to the vehicle to ensure the safety of the passenger. When the vehicle is a public bus, an additional concern is the ease by which the operator can secure and release the wheelchair so that a minimum of time is spent in this activity. Further, it is often necessary to provide a vehicle with a plurality of tie-down stations whereby a plurality of passengers in wheelchairs can be accommodated simultaneously.

Prior wheelchair tie-downs are awkward in use. For example, one such tie-down comprises a number of receptacles in the floor of a transit vehicle and an equal number of straps, each with a hook at one end for engaging the frame of the wheelchair and a lug at the opposite end for engaging one of the receptacles. This system is very difficult in use because it requires the operator first to locate the straps and then to attach the straps to the chair and the floor and adjust their lengths, which requires reaching, bending, and the like. Moreover, the straps are often not available, having been lost between uses because they are not attached to the bus when not in use, and when found, they are usually dirty from contact with the floor or storage in a box with other items. Securing the straps to the floor during periods of non-use is not feasible because their presence would restrict movement of the wheelchair into or out of the station and would present a hazard, possibly tripping others walking in the bus. Further, the heel of a high-heeled shoe is easily caught in the receptacles themselves, resulting in personal injury, property damage, and delay.

SUMMARY OF THE INVENTION

In accordance with the invention a strong, safe, and easily applied tie-down for wheelchairs is provided. The tie-down finds particular utility in a public bus, where the safe and efficient ingress and egress of wheelchair passengers is very important to ensure safety and reduce delays for all passengers. Moreover, the tie-down of the invention does not require dedicated floor space, thus allowing other passengers to use the same floor space when wheelchair passengers are not present.

In the preferred embodiment, the tie-down of the invention is located in a bus adjacent chairs that fold against the side of the bus to expose the floor space beneath the chairs. Two wheelchairs are preferably arranged in this space with both of them facing forward, either on respective sides of the vehicle or in tandem.

A first securing element is fixed to the bus at one end of the space to be occupied by a wheelchair, and a second securing element is movably attached to the other end of the space to be occupied by that wheelchair. The second securing element is preferably pivotally attached to the bus for movement horizontally, whereby it may be placed in an unobtrusive storage position adjacent the side of the bus and moved to an operative, securing position, extending perpendicularly from the side of the bus when required. Each of the first and second securing elements carries straps with hooks for engaging the structure of the wheelchair to hold it to the securing elements. The straps are preferably carried by winches that can be operated easily and quickly to release or retract the straps whereby they may be attached and tightened, or released and detached easily.

When the space is to be occupied by more than one wheelchair, a third securing element is fixed to the bus at the opposite end of the wheelchair space, such that the movable securing element, when in its operational position, is midway between front and rear securing elements. In the preferred embodiment, the rearmost securing element is fixed and the central and front securing elements are pivotal.

The movable securing element includes means for holding it in the storage and operational positions. The particular means may be any of several designs, but the preferred design for holding this element in the operational position is a vertically-movable pin carried by the movable element for engaging an aperture in a floor plate when the securing element is in the operational position. This pin includes a handle at its upper end for easy grasping by the operator to push the pin into the recess when a wheelchair is being secured and to pull it from the recess to move the securing element to the storage position. The pin is preferably a "Ball-lok" pin that includes retractable retaining balls near the end of the pin. These balls are controlled by a central shaft that is axially movable. The shaft is spring-biased to a position where the balls are in the locking position, and the shaft can be moved by pressing on one end to a position where the balls move inward to release the pin from the floor plate. Thus, when the pin is placed in an aperture in the floor plate, the balls will protrude from the sides of the pin to engage the aperture and prevent removal of the pin. The operator can remove the pin from the floor plate by depressing the button formed by the end of the shaft and lifting the pin from engagement with the floor plate.

Other means may be used for securing the movable element. For example, the latch for retaining the movable element in the storage position may be located near the pivot axis. Thus, the end of the movable element near the wall could be provided with an element, such as a disk with apertures for cooperating with a removable pin for holding the disk and the movable securing element in any of several predetermined positions, including the operational and storage positions.

It will be appreciated that the movable securing element may be mounted for movement in other than a horizontal plane. For example, this element may be mounted for movement vertically in those situations where passengers not in wheelchairs will not be bothered by the presence of the movable element in the storage position. Also, the movable element could be made such that it telescopes outwardly from the side wall of the bus. In this arrangement, storage would be in a collapsed configuration, and operation would be from an expanded configuration. As well, the vertically movable element could be telescoping whereby the stored position would not interfere with other passengers.

In operation, a wheelchair passenger approaches the space having the tie-down such that one end of the wheelchair is adjacent one of the front or rear securing elements. If the entire space is unoccupied, this is very easy because the movable element will be in its storage position. If the space is already occupied by a first wheelchair, it may be necessary for the bus operator to move the movable element slightly to facilitate entry of the second wheelchair. In either situation, the wheelchair is positioned in the wheelchair area with one end of the wheelchair adjacent one set of securing elements located at opposite ends of the area, and the central movable element is moved into position adjacent the other end of the wheelchair. The operator presses the pin into the recess to secure the movable element, and the straps are attached to the frame of the wheelchair. In the preferred embodiment, there are four straps with hooks or looped belts that engage the frame. The straps are carried by winches, which are turned by the operator to tighten the straps. When a wheelchair passenger desires to exit the bus, the operator releases the straps by actuating release buttons on the winches, removes the hooks from the wheelchair, and, if necessary, moves the movable element to allow the passenger to exit the bus.

An advantage of the movable element is that it may be moved to provide aisle clearance when required.

The above description has focused on operation with regard to a wheelchair having a tubular frame. The invention may be used equally well for other types of vehicles, such as electric powered vehicles with non-tubular frames, such as "scooters." Securing such a vehicle merely requires that straps be located on the fixed and movable elements with engaging elements designed for the frame of this type of vehicle. In this connection it is noted that the term "wheelchair" as used herein refers generally to any type of personal vehicle.

It is an object of this invention to provide a tie-down for a wheelchair that provides passenger safety and is easy to operate, resulting in significantly reduced time required by the vehicle operator.

Another object of this invention is to provide a tie-down for a wheelchair that makes economical use Of the available space on a vehicle.

Yet another object of this invention is to provide a unique method for securing wheelchairs to a vehicle.

Still another object of the invention is to provide a tie-down for a wheelchair that retains the securing straps in safe, permanent location that is isolated from debris normally found in high-use vehicles, whereby the straps are maintained in better condition readily available for use.

These and other objects will be apparent from the following detailed description.

DETAILED DESCRIPTION OF THE PREFERRED EMBODIMENT

Figure 1:
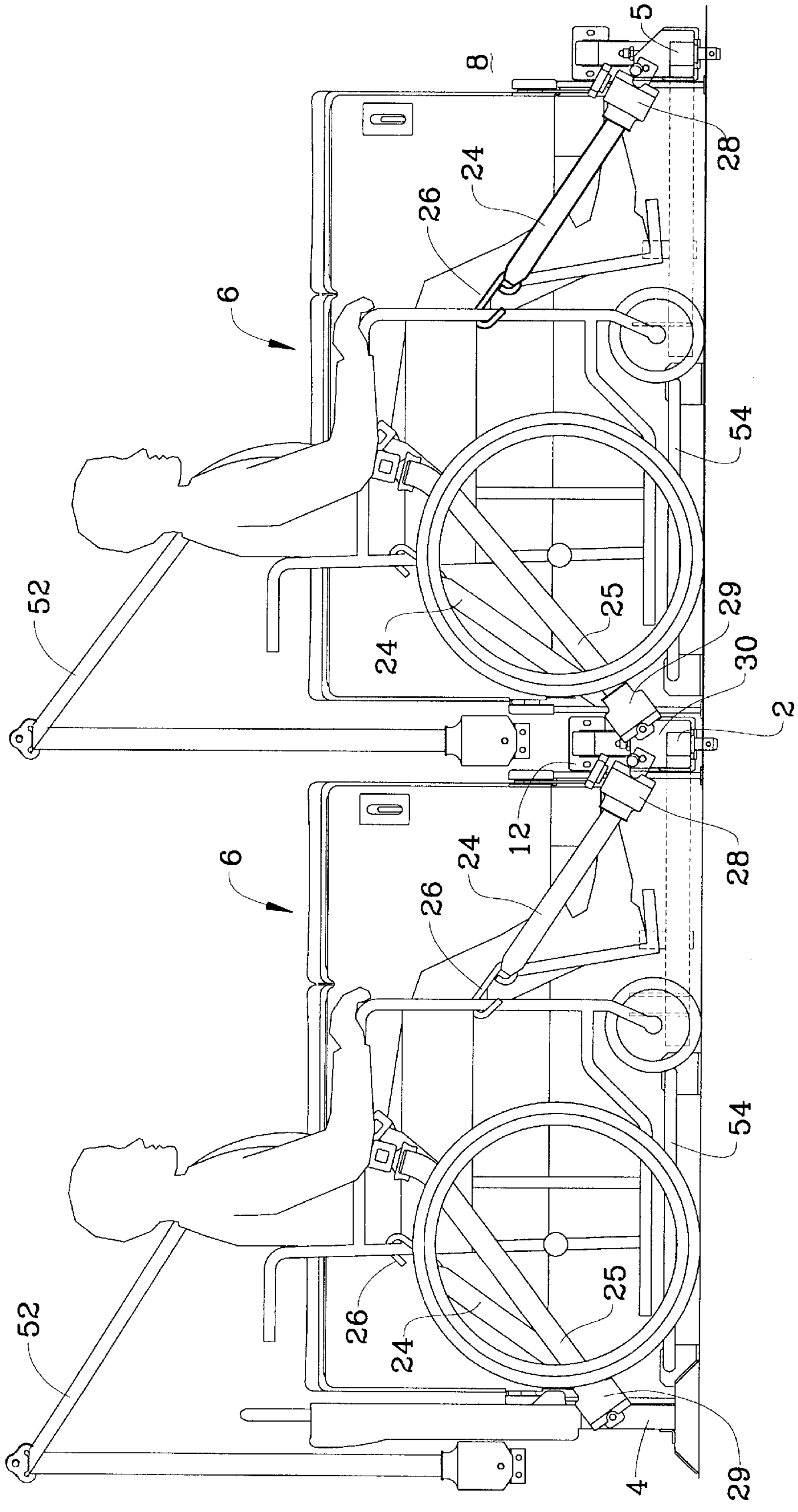
FIG. 1 is a side elevation view of a tie-down in accordance with the invention.
Figure 2:
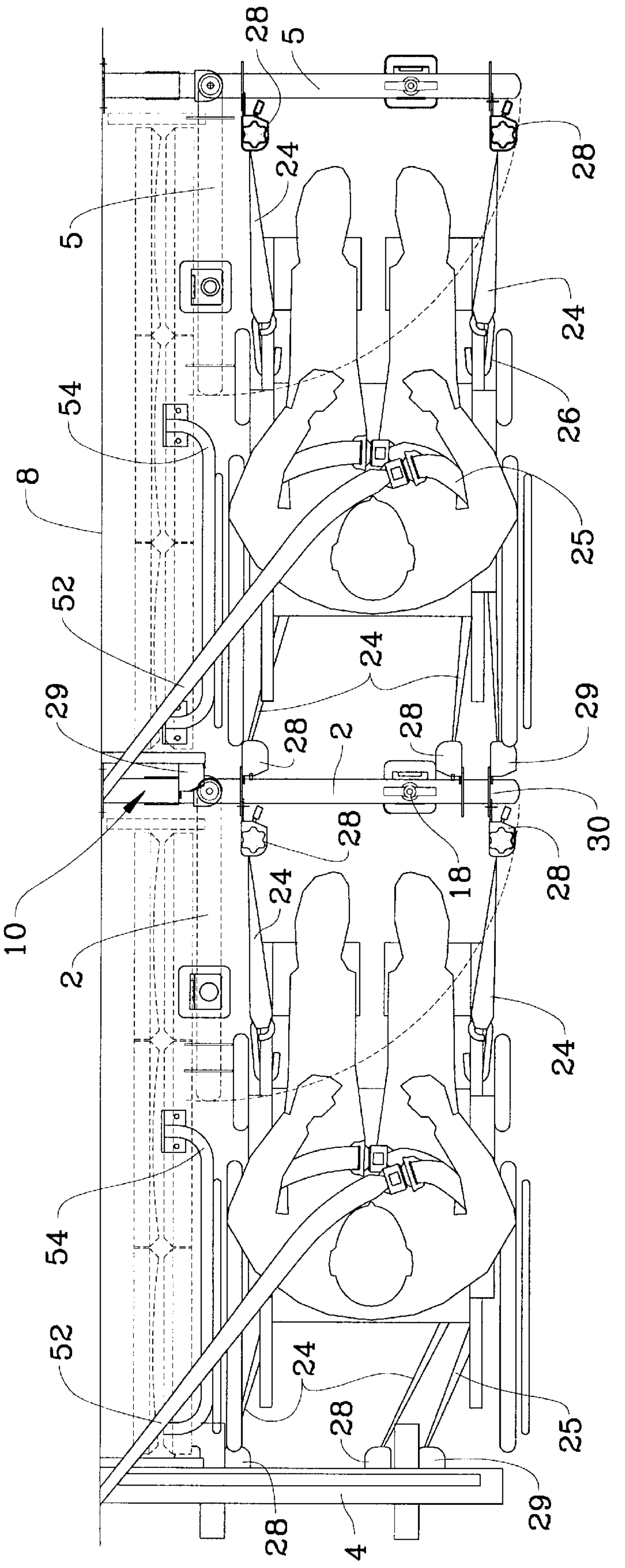
FIG. 2 is a top plan view of a tie-down in accordance with the invention installed on a bus.

FIGS. 1 and 2 illustrate a tie-down in accordance with a preferred embodiment of the invention installed in a bus. The tie-down shown in these figures is arranged to accommodate two wheelchairs in a wheelchair securing area and comprises a central movable securing element 2 located between the wheelchairs, a fixed securing element 4 at the rear of the area, and a second movable securing element 5 at the front of the area. The wheelchair securing area may also be occupied by side-facing seats 6, which are shown in their folded-up positions. Thus, the space occupied by the tie-down to be described is used by passengers in seats such as 6 when not occupied by passengers in wheelchairs and seats 6 are folded down.

The movable securing element 2 is mounted for pivotal movement to and from the operational position, shown in solid lines in FIG. 1, where it extends perpendicularly from the side wall 8 of the bus. When not in use, the movable securing element 2 may be moved to a storage position, which is shown in phantom lines. As well, element 5 is constructed similarly to that of the movable element 2 and may be moved to a storage position, also shown in phantom lines, when not in use.

Figure 3:
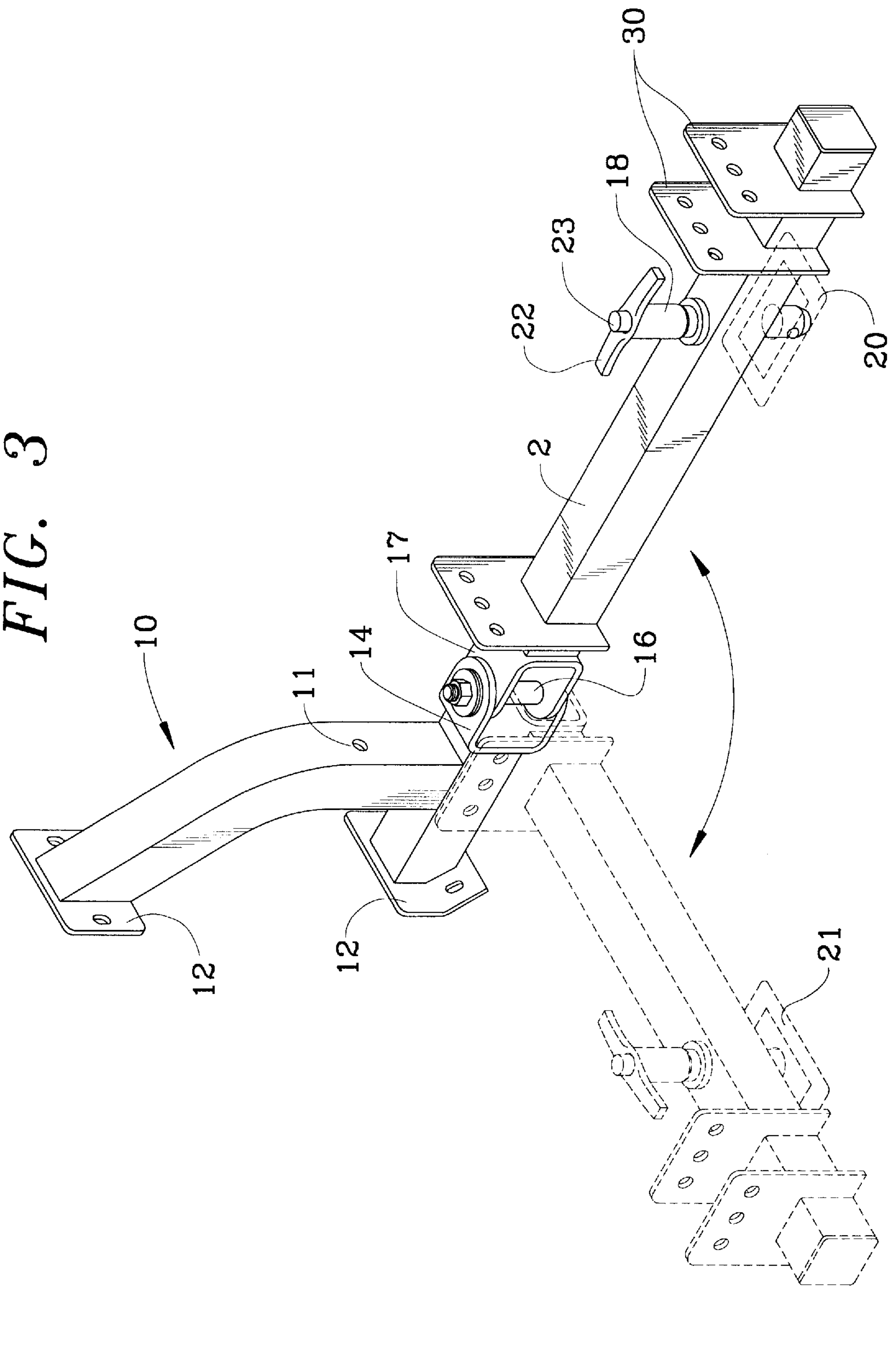
FIG. 3 is a perspective of a movable element used in the embodiment shown in FIGS. 1 and 2.

The end of the movable securing element nearer the side wall of the bus is pivotally connected to the bus. With reference also to FIG. 3, the connection is provided by a bracket 10, which is bolted to the side wall of the bus at flanges 12. The lower part of the bracket includes a U-shaped pivot bracket 14, which receives a pivot pin 16. The pin 16, in turn, engages a second U-shaped bracket 17 in the end of the movable element 2 to provide pivotal movement of the element 2 about the pin.

A releasable locking mechanism is provided on the movable securing element remote from the pivot pin 16. In the preferred embodiment, the locking element includes a vertically-movable locking pin 18 and a floor plate 20 with a recess therein, which will be more fully described below with respect to FIGS. 5 and 6. The recess in the floor plate receives the pin 18 to secure the movable element 2 in the operational position when the pin is moved downward. The upper end of the pin 18 has a handle 22 for facilitating upward movement of the pin by the operator to disengage the pin from the recess, whereby the movable element 2 may be pivoted forward or rearward. The pin 18 is preferably of the type sold under the trademark "Bal-lok," which has locking balls at one end that are controlled by a spring-loaded, central shaft. The upper end of the shaft forms a button 23 for allowing the operator to depress the shaft and release the balls by pressing on the button. When the balls are held outward by the shaft, the pin 18 will be secured in the recess, and depression of the button will release the pin.

Each of the fixed and movable securing elements includes at least two adjustable straps 24, each of which has a hook 26 for engaging the frame of a wheelchair. Each strap is contained in a housing 28, which is attached to the securing element at desired locations. The housings may provide a hand-operated winch for allowing the operator to tighten the strap after the hook is applied to the frame of the wheelchair by rotation of the winch. Preferably, the housings carrying straps for the front of the wheelchair include winches, while those for engaging the rear of the chair do not require that structure. The housings include quick-release features as are known in the art to allow the straps to be released easily for unrolling the straps, disengaging the hooks, and freeing the wheelchair. The housings 28 are preferably arranged in spaced pairs for engaging the left and right sides of the front and rear of the wheelchairs at angles that will be the most effective. Such angles have been determined and are generally known to those of skill in the art.

With reference to FIGS. 1 and 2, the passenger seat belts 25 are also provided, which are carried in housings 29. Generally, the desirable arrangement is for the passenger lap belt housings 29 to be spaced more widely than that of housings 28 for the rear wheelchair-restraining belts. Thus, in the configuration shown in the figures, where the wheelchairs are both facing forward, the housings 29 having lap belts for the front passenger are more widely spaced than are the housings 28 that contain wheelchair restraining belts for the rear of the front wheelchair. In the embodiment shown, one of the housings 29 is placed on an outboard end of the movable element 2, and the other is placed on the mounting bracket 10, for example, at threaded opening 11. The housings 28 for the wheelchair restraining belts for the fronts of the wheelchairs are spaced more widely than are the housings for the rear of a wheelchair and are preferably spaced at the same distance as are the housings for the passenger restraining belts. Clearly, other arrangements may be useful for other situations.

The housings 28 and 29 are preferably mounted to the movable securing element 2 and 5 by respective mounting brackets 30 and 32. These brackets are secured to the movable elements, as by welding, and include mounting holes for receiving mounting bolts (not shown) that extend through the bracket and engage threaded openings in the belt housings. The mounting brackets preferably mount the housings on top of the movable element, as shown, to provide ready access for the operator and to reduce the likelihood they will become contaminated with dirt, water, and the like from the floor of the vehicle. The housings are preferably mounted with washers that allow the housings to pivot and align automatically with the angle of the tension placed on the belts themselves.

As noted, the movable elements 2 and 5 may be moved to non-operational positions when there are no wheelchair passengers and the chairs 6 are in use. The elements are retained in the non-operational positions, shown in phantom lines in FIGS. 3 and 4, by second floor plates 21, which are the same as floor plates 20.

The fixed securing element 4 is a rigid, L-shaped element bolted to the side wall and floor of the vehicle in known manner and may include a partition as illustrated.

Figure 4:
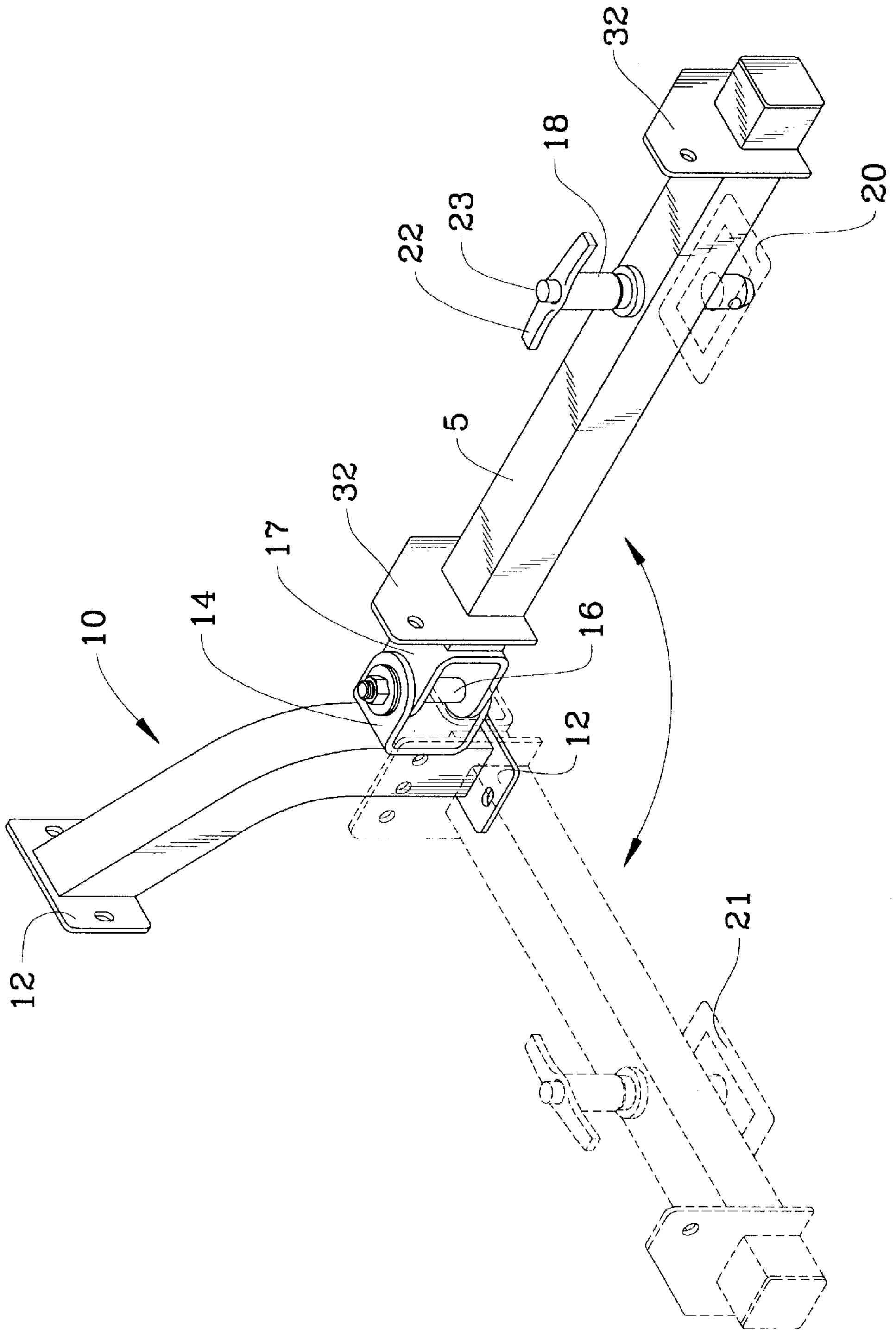
FIG. 4 is a perspective of a second movable element used in the embodiment shown in FIGS. 1 and 2.

FIG. 4 is a perspective of front movable element 5. This element includes mounting brackets 32, which mount only two housings 28 for securing the front of the wheelchair of the front passenger. Also, the bracket 10 shown in FIG. 4 is of an optional configuration wherein one flange 12 attaches to the side wall of the vehicle, and the other flange attaches to the floor of the vehicle. That configuration may be used for the central securing element, as well.

Figure 5:
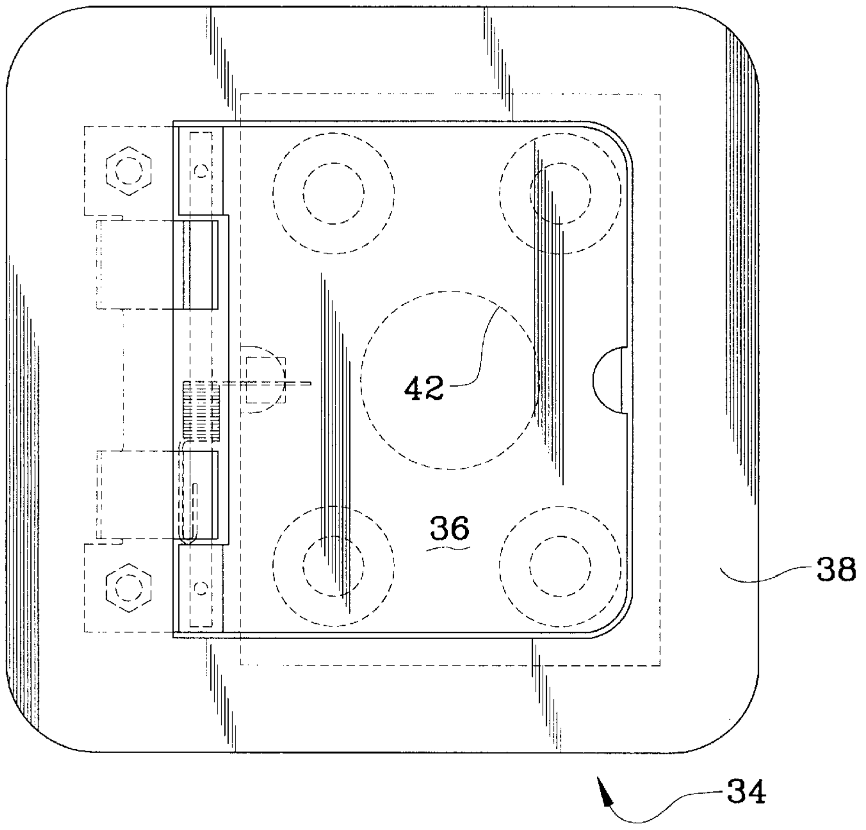
FIG. 5 is a top plan view of the floor plate.
Figure 6:
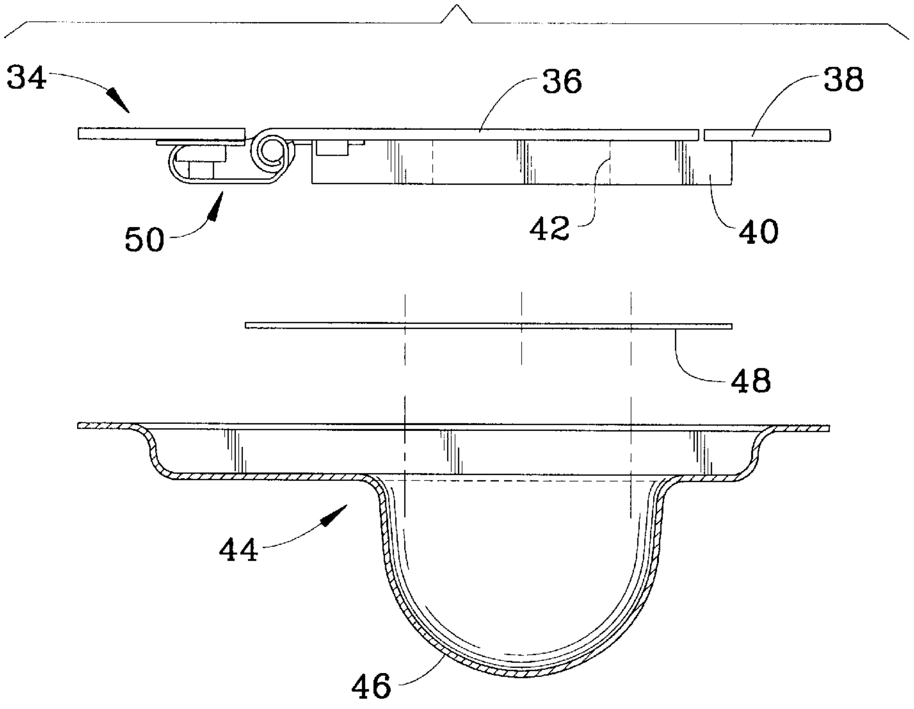
FIG. 6 is an exploded view of the floor plate of FIG. 4 and partially in cross section.

FIGS. 5 and 6 illustrate a preferred embodiment of the floor plate. The floor plate includes a cover assembly 34, which comprises a cover 36 hinged to a top plate 38. A securing plate 40 is welded to the bottom of the top plate and includes a hole 42 therein for receiving the locking pin 18. A lower cover plate 44 is the lowermost part of the assembly and includes a pan portion 46 for being placed in an opening in the floorboard of the vehicle. A seal 48 made of flexible material such as Neoprene is placed between the top cover assembly and the lower cover plate to prevent accumulation of debris in the pan 46 through the hole 42. In turn, the pan 46 seals the assembly from entry of debris from below the assembly.

The cover 36 is attached by hinges 50, which are known in the art, for allowing the cover to be easily opened and to have a full 180° range of motion.

Figure 7:
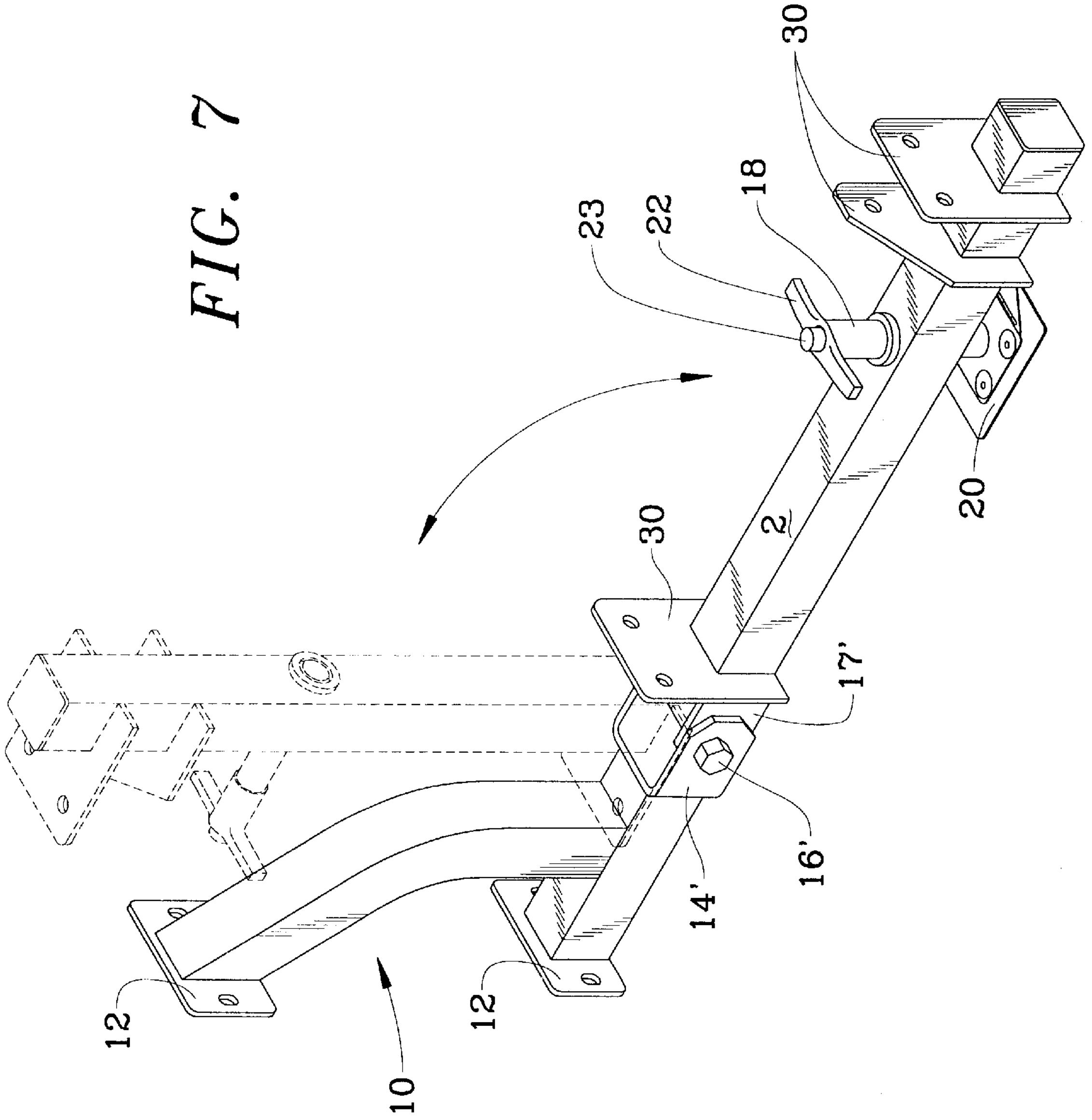
FIG. 7 is a perspective of another embodiment of a movable element.

FIG. 7 illustrates an embodiment wherein the movable securing element 2 is mounted for vertical motion with respect to the vehicle. This is attained by providing a pivotal mounting bracket 14', which is rotated 90° with respect to the bracket 14, and a second bracket 17' also rotated 90° with respect to bracket 17. Thus, a pivot pin 16' is horizontal to provide vertical movement of the movable-element 2. A storage position of the movable element is shown in FIG. 7 in phantom lines. The movable element may be held in the storage position in any of several ways, such as by a known strap or latch.

Figure 8B:
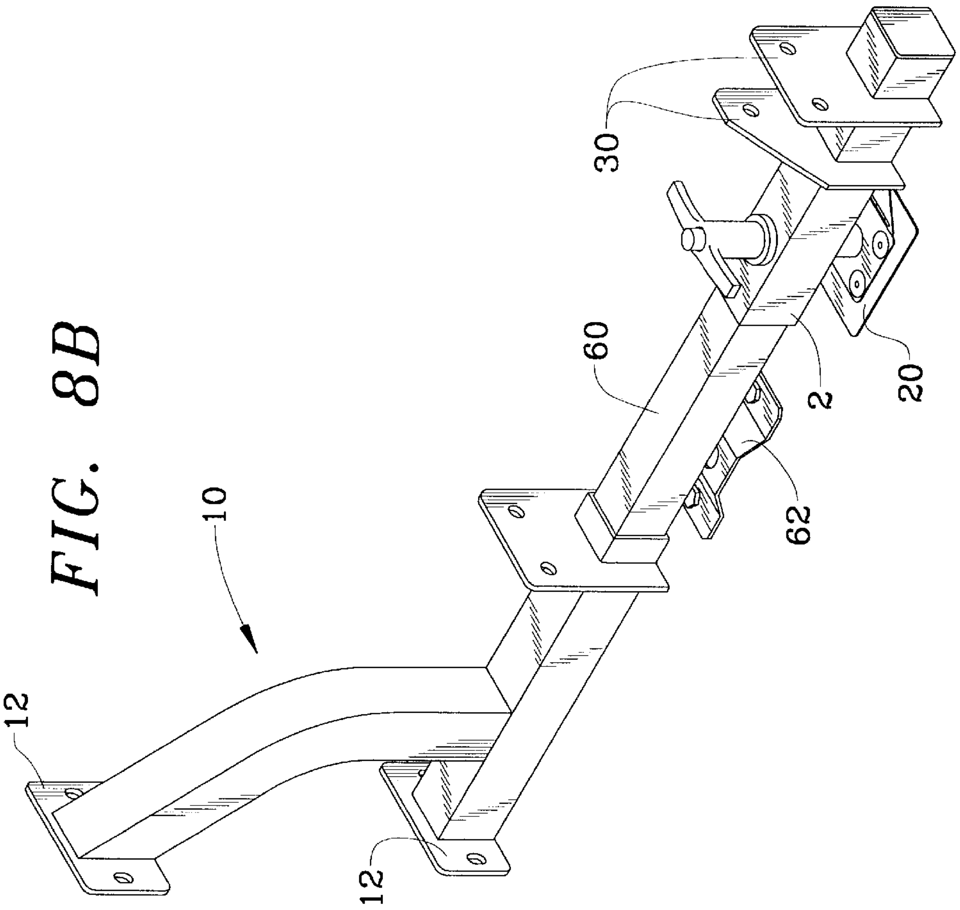
FIGS. 8*a* and 8*b* are perspectives of a further embodiment of a movable element.
Figure 8A:
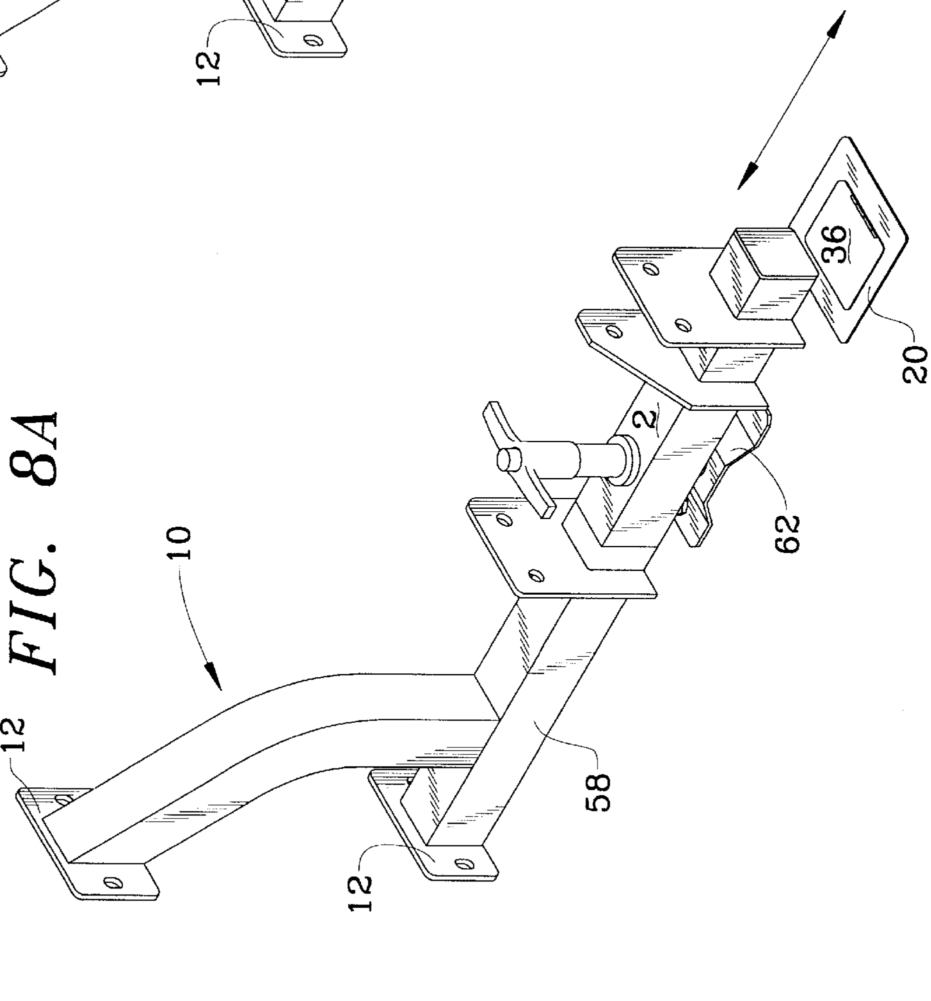

FIGS. **8*a* and 8*b* show yet another embodiment wherein the movable element 2 telescopes. Thus, the bracket 10, includes a fixed horizontal portion 58 that receives a reduced diameter portion 60 of movable element 2 whereby the movable element can be moved between the storage position of FIG. 8*a* and the operative position of FIG. 8*b* by sliding the portion 60 with respect to fixed horizontal portion 58. In this embodiment, the movable element 2 is held in the storage position of FIG. 8*a* by engagement between the locking pin 18 and a second floor plate 62, which is located inboard of floor plate 20. The movable element 2 is held in the operative position shown in FIG. 8*b* by engagement between the locking pin 18 and the recess and floor plate 20**.

In operation, the system of the invention greatly facilitates transportation of passengers in wheelchairs. A significant advantage of the invention is that the time required for securing or releasing a wheelchair is greatly reduced from prior systems. Further, because the straps are permanently attached, they will be readily available for use, which obviates the drivers searching for loose straps, as in the prior art systems. The straps are also clean and in good repair because they are retained in the housings when not in use. Still further, the invention allows the wheelchair area to be used by other passengers when the seats 6 are placed in their operational positions (not illustrated). Of course, the area designated for wheelchairs may be used exclusively for wheelchairs. The securing elements are shown in FIGS. 1 and 2 in the configuration wherein the wheelchairs are placed in tandem, with both facing forward. It is also possible for the securing elements to be placed such that the wheelchairs are facing each other, or more preferably, arranged with a single wheelchair facing forward on each side of the vehicle. In this latter case, each arrangement would be very much like that for the rear wheelchair in FIGS. 1 and 2. In the case of a single wheelchair station, however, the brackets on the movable element for the housings would have the configurations shown in FIG. 4.

The wheelchairs are easily attached to the securing elements by pivoting the movable elements to positions that will allow the wheelchairs to be rolled into the desired positions. Guide bars 54 are placed along the side walls to assist in positioning the wheelchairs in a direction transverse to the bus. Then, the operator places the movable elements in the positions shown in FIGS. 1 and 2 and attaches the wheelchair restraining straps and the passenger safety belts. In the configuration shown in FIGS. 1 and. 2 shoulder belts 52 are used as well as lap belts to ensure safety.

Modifications within the scope of the appended claims will be apparent to those if skill in the art.

We claim:

1. In combination, (a) a vehicle having an area for receiving a wheelchair, and (b) means for securing a wheelchair in said area to said vehicle, wherein said means for securing is permanently attached to said vehicle and comprises:

(i) means for engaging a portion of said wheelchair under tension, said means for engaging being locked to said vehicle at a predetermined location, and (ii) a movable securing element having mounted thereon a housing and a flexible strap, said flexible strap having one end adjustably received in said housing and an opposite end adapted to engage a portion of said wheelchair in said area under tension, said movable securing element being movable with respect to said vehicle between an operating position wherein said housing is locked to said vehicle at a further location for cooperation with said means for engaging to secure said wheelchair and a storage position wherein said housing is remote from said further location.

2. A combination according to claim 1 wherein said means for engaging comprises a housing and a strap adjustably received in said housing.

3. A combination according to claim 2 wherein said means for engaging is attached to a stationary element attached to said vehicle in a fixed position with respect to said area.

4. A combination according to claim 3, wherein said stationary element is attached to said movable securing element.

5. A combination according to claim 3, wherein said movable securing element is at one end of said area and said stationary element is at an opposite end of said area.

6. A combination according to claim 5 wherein said area comprises a first area for receiving a first wheelchair and a second area longitudinally aligned with said first area for receiving a second wheelchair, and said movable securing element is located between said first area and said second area.

7. A combination according to claim 6 wherein said means for securing further comprises a forward movable securing element having means thereon for engaging a portion of said second wheelchair in said second area, said forward movable securing element being movable with respect to said vehicle between an operating position wherein said means for engaging a portion of said second wheelchair is located relative to said second area to allow said means for engaging a portion of said second wheelchair to be attached to said portion of said second wheelchair and a storage position wherein said means for engaging a portion of said second wheelchair is located relative to said second area to be remote from said portion of said second wheelchair.

8. A combination according to claim 3 wherein said stationary element comprises a first stationary element attached to said movable element at one end of said area and a second stationary element at an opposite end of said area.

9. A combination according to claim 1 further comprising latch means for holding said movable securing element in said operating position when said latch means is engaged and for allowing said movable securing element to be moved to said storage position when said latch means is disengaged.

10. A combination according to claim 9 wherein said latch means comprises a vertically movable pin and a recess for receiving said pin.

11. A combination according to claim 10 wherein said recess comprises a securing plate having an opening for receiving said pin, enclosure means beneath said securing plate forming a cavity for receiving a tip of said pin and for preventing debris from impacting said securing plate and pin from below said plate, and a flexible seal covering said plate for preventing debris from impacting said securing plate and pin from above said securing plate, and a pivotally mounted cover plate covering said flexible seal.

* * * * *